(12) United States Patent
Oh et al.

(10) Patent No.: US 11,862,403 B2
(45) Date of Patent: Jan. 2, 2024

(54) METHOD OF MANUFACTURING MULTILAYER CERAMIC CAPACITOR AND MULTILAYER CERAMIC CAPACITOR

(71) Applicant: SAMSUNG ELECTRO-MECHANICS CO., LTD., Suwon-si (KR)

(72) Inventors: Young Joon Oh, Suwon-si (KR); Seong Han Park, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 35 days.

(21) Appl. No.: 17/725,848

(22) Filed: Apr. 21, 2022

(65) Prior Publication Data

US 2023/0187140 A1  Jun. 15, 2023

(30) Foreign Application Priority Data

Dec. 15, 2021  (KR) .......................... 10-2021-0179781

(51) Int. Cl.
*H01G 4/30*  (2006.01)
*H01G 4/248*  (2006.01)

(52) U.S. Cl.
CPC ............... *H01G 4/30* (2013.01); *H01G 4/248* (2013.01)

(58) Field of Classification Search
None
See application file for complete search history.

(56) References Cited

U.S. PATENT DOCUMENTS

| | | | | |
|---|---|---|---|---|
| 6,839,221 | B2* | 1/2005 | Sugimoto | ............... H01G 4/12 361/321.2 |
| 8,947,851 | B2* | 2/2015 | Koizumi | ............... H01G 4/1227 361/321.2 |
| 9,812,261 | B2* | 11/2017 | Fukunaga | ............... H01G 4/005 |
| 10,586,652 | B1* | 3/2020 | Kwon | ..................... H01G 4/224 |
| 10,614,955 | B2* | 4/2020 | Park | ..................... H01G 4/0085 |
| 11,610,739 | B2* | 3/2023 | Lee | ......................... H01G 4/012 |

(Continued)

FOREIGN PATENT DOCUMENTS

| | | |
|---|---|---|
| JP | 2009-246133 A | 10/2009 |
| JP | 2017-147358 A | 8/2017 |

(Continued)

*Primary Examiner* — Dion R. Ferguson
(74) *Attorney, Agent, or Firm* — Morgan, Lewis & Bockius LLP

(57) ABSTRACT

A method of manufacturing a multilayer ceramic capacitor includes preparing a ceramic green sheet in which a plurality of internal electrode patterns are formed with a predetermined distance therebetween, forming a ceramic laminate by laminating a plurality of the ceramic green sheets in a first direction, cutting the ceramic laminate to have a side surface from which an end of the internal electrode pattern is exposed in a second direction perpendicular to the first direction, forming a margin portion on the side surface from which the end of the internal electrode pattern is exposed, and forming a ceramic body including a dielectric layer and an internal electrode by firing the cut-out ceramic laminate. The forming a margin portion includes flowing a ceramic paste from an upper portion to a lower portion of the cut-out ceramic laminate.

16 Claims, 11 Drawing Sheets

(56) References Cited

U.S. PATENT DOCUMENTS

| | | | |
|---|---|---|---|
| 2004/0233612 A1* | 11/2004 | Sugimoto | H01G 4/30 361/312 |
| 2011/0141660 A1* | 6/2011 | Jeong | H01G 4/12 361/321.2 |
| 2016/0293332 A1 | 10/2016 | Kato et al. | |
| 2017/0148572 A1* | 5/2017 | Fukunaga | H01G 4/1227 |
| 2018/0108482 A1* | 4/2018 | Kogure | H01G 4/224 |
| 2020/0043668 A1* | 2/2020 | Park | H01G 4/005 |
| 2020/0051739 A1* | 2/2020 | Park | H01G 4/30 |
| 2020/0111613 A1 | 4/2020 | Teraoka et al. | |
| 2020/0126724 A1 | 4/2020 | Takagi | |
| 2020/0312555 A1 | 10/2020 | Doi et al. | |
| 2020/0402717 A1* | 12/2020 | Lee | H01G 4/008 |
| 2021/0057157 A1* | 2/2021 | Lee | H01G 4/30 |
| 2021/0142945 A1* | 5/2021 | Park | H01G 4/008 |
| 2021/0151255 A1* | 5/2021 | Tahara | H01G 4/232 |
| 2022/0148811 A1* | 5/2022 | Kwon | H01G 4/12 |
| 2022/0199330 A1* | 6/2022 | Kwon | H01G 4/224 |
| 2023/0187140 A1* | 6/2023 | Oh | H01G 4/1227 361/301.4 |

FOREIGN PATENT DOCUMENTS

| | | | |
|---|---|---|---|
| JP | 6436921 B2 | | 12/2018 |
| JP | 2019-016688 A | | 1/2019 |
| JP | 2020-057738 A | | 4/2020 |
| JP | 2020-068227 A | | 4/2020 |
| JP | 2020-167198 A | | 10/2020 |
| KR | 20190116113 A | * | 10/2019 |
| KR | 20190116119 A | * | 10/2019 |
| KR | 20200095443 A | * | 8/2020 |
| KR | 20220031596 A | * | 3/2022 |

* cited by examiner

METHOD OF MANUFACTURING MULTILAYER CERAMIC CAPACITOR AND MULTILAYER CERAMIC CAPACITOR

CROSS-REFERENCE TO RELATED APPLICATIONS

This application claims the benefit of priority to Korean Patent Application No. 10-2021-0179781 filed on Dec. 15, 2021 in the Korean Intellectual Property Office, the disclosures of which are incorporated herein by references in its entirety.

BACKGROUND

1. Field

The present disclosure relates to a method of manufacturing a multilayer ceramic capacitor and a multilayer ceramic capacitor manufactured thereby.

2. Description of Related Art

Generally, electronic components using a ceramic material such as a capacitor, an inductor, a piezoelectric element, a varistor or thermistor may include a ceramic body formed of a ceramic material, an internal electrode formed within the body, and an external electrode installed on the surface of the ceramic body to be connected to the internal electrode.

Recently, as electronic products have been designed to have a reduced size and multifunctionality, chip components have also been designed to have a reduced size and high functionality, such that a multilayer ceramic capacitor has also been required to have a reduced size and high capacitance.

Generally, a margin portion may be formed by firing a region of a ceramic green sheet other than the region in which an internal electrode pattern is formed. However, a step difference may be formed in the process of laminating, pressing, and cutting ceramic green sheets formed in several tens to several hundreds of layers such that an internal electrode pattern may be bent, which may lower reliability of the multilayer ceramic capacitor.

To address the above issue, generally, by exposing an internal electrode in a width direction of a chip to implement a design without a margin, an area of the internal electrodes in the width direction may be increased, and after a chip is manufactured, a margin portion may be attached to the exposed surface of the electrode in the width direction of a chip before firing is performed.

However, when the multilayer ceramic capacitor is manufactured as described above, a dielectric composition for forming the margin portion may not be different from a dielectric composition of the ceramic body, and the same dielectric composition of the ceramic body may be used.

Accordingly, physical filling density of a dielectric material in the margin portion may be low, such that density of the margin portion may decrease. Also, during a sintering process, a void in the interfacial surface between an end of the internal electrode and a bonding surface of the margin portion may not be filled due to mismatching in sintering driving between a dielectric of the margin portion and the internal electrode, which may degrade moisture resistance reliability of the multilayer ceramic capacitor.

Also, as for the general method, a ceramic green sheet working as a margin portion may be attached to a green chip which has been cut without a margin by physical compression, and a sintered solid body may be formed through a high-temperature heat treatment. Accordingly, when adhesive force between the sheet for forming the margin portion and the exposed surface of the electrode is not sufficient, the margin portion may be peeled off, which may cause defects in an exterior and cracks in the interfacial surface.

Further, in the process of high-temperature heat treatment, when a volume changes is accompanied inwardly of the chip due to reduction of the internal electrode, a void may be formed between the end of the electrode and the interfacial surface of the margin portion, which may act as a starting point for cracks or a path for moisture-resistant permeation, and moisture resistance reliability may be degraded.

SUMMARY

An aspect of the present disclosure is to provide a multilayer capacitor in which the degradation of moisture resistance reliability caused by a decrease in sintering density of a margin portion of the multilayer ceramic capacitor may be addressed.

An aspect of the present disclosure is to provide a multilayer capacitor in which cracks caused by a step difference and pores may be addressed.

According to an aspect of the present disclosure, a method of manufacturing a multilayer ceramic capacitor includes preparing a plurality of ceramic green sheets in which a plurality of internal electrode patterns are respectively formed with a predetermined distance therebetween, forming a ceramic laminate by laminating the plurality of ceramic green sheets in a first direction, cutting the ceramic laminate to have a side surface from which an end of an internal electrode pattern among the plurality of internal electrode patterns is exposed in a second direction perpendicular to the first direction, forming a margin portion on the side surface of the ceramic laminate, and forming a ceramic body including a dielectric layer and an internal electrode by firing the cut-out ceramic laminate, in which the forming a margin portion includes flowing a ceramic paste from an upper portion to a lower portion of the cut-out ceramic laminate.

According to another aspect of the present disclosure, a multilayer ceramic capacitor includes a ceramic body including a dielectric layer and a plurality of internal electrodes laminated in a first direction with the dielectric layer interposed therebetween, margin portions disposed on opposite surfaces of the ceramic body opposing in a second direction perpendicular to the first direction, and external electrodes disposed on opposite surfaces opposing in a third direction perpendicular to the first and second directions and connected to the internal electrodes, in which the margin portion has a density higher than a density of the dielectric layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
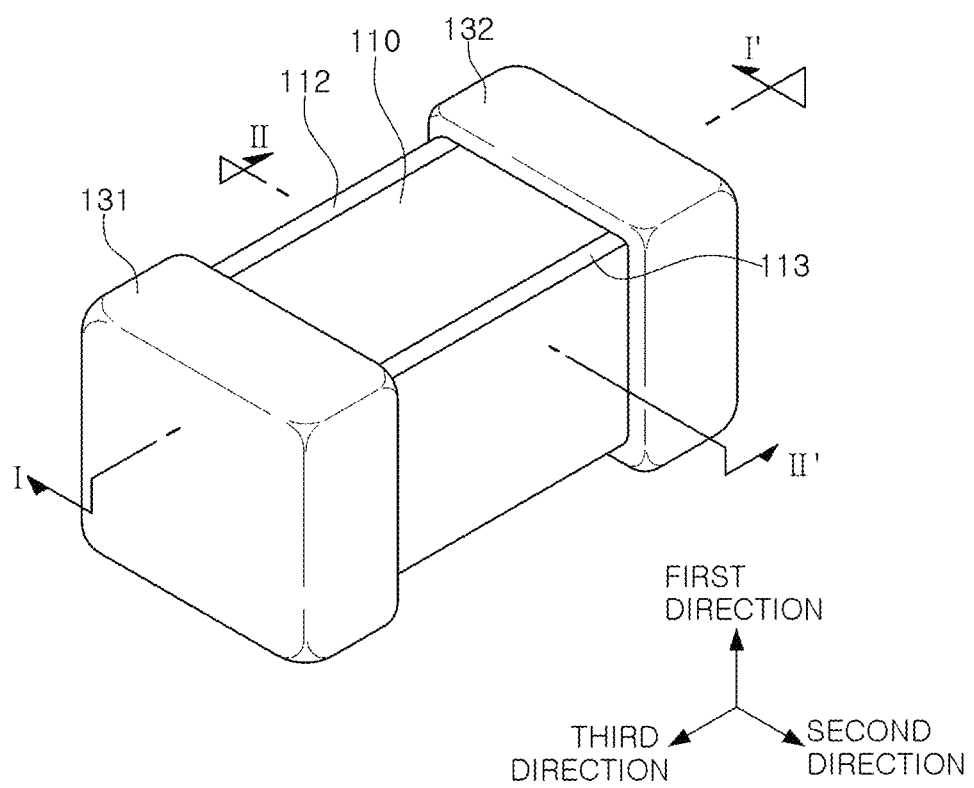
FIG. 1 is a perspective diagram illustrating a multilayer ceramic capacitor according to an exemplary embodiment of the present disclosure.
Figure 2:
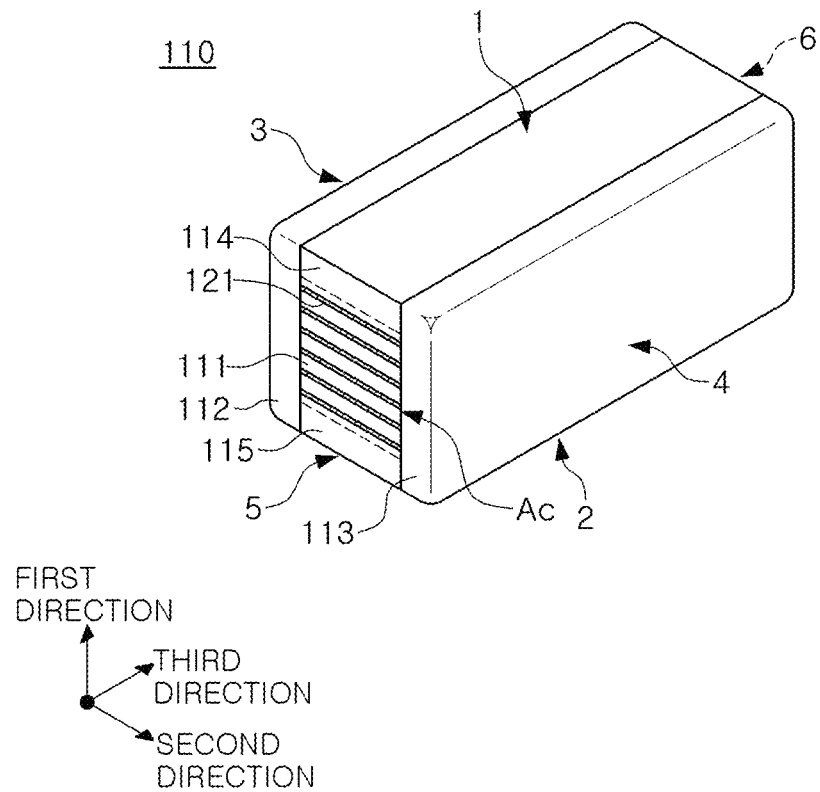
FIG. 2 is a perspective diagram illustrating a ceramic body of a multilayer ceramic capacitor.
Figure 3:
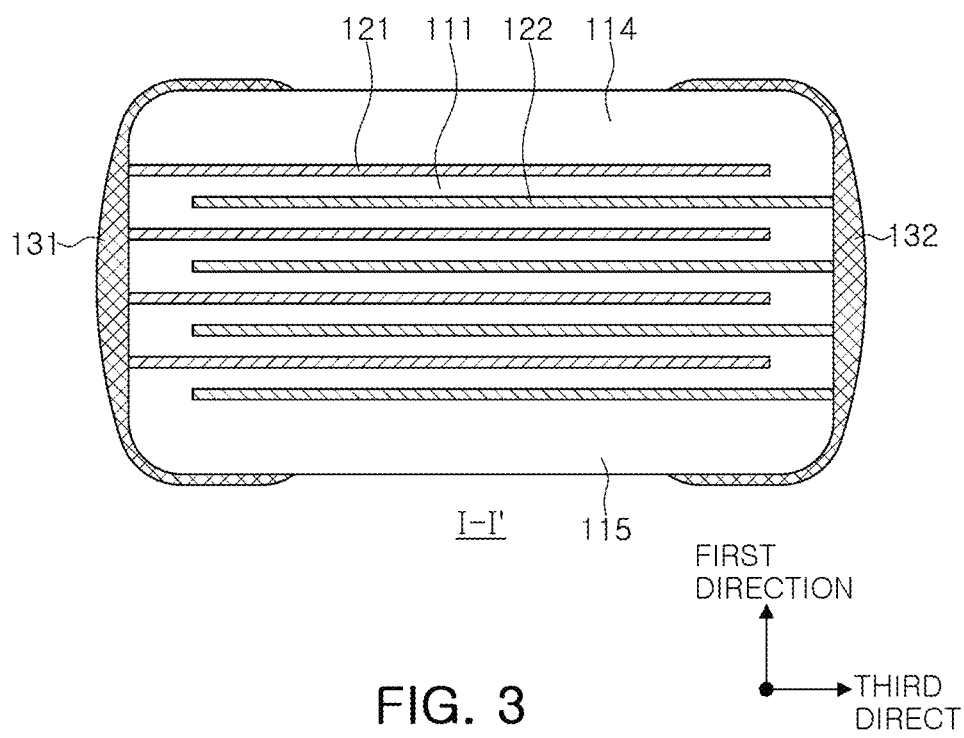
FIG. 3 is a cross-sectional diagram taken along line I-I' in FIG. 1.
Figure 4:
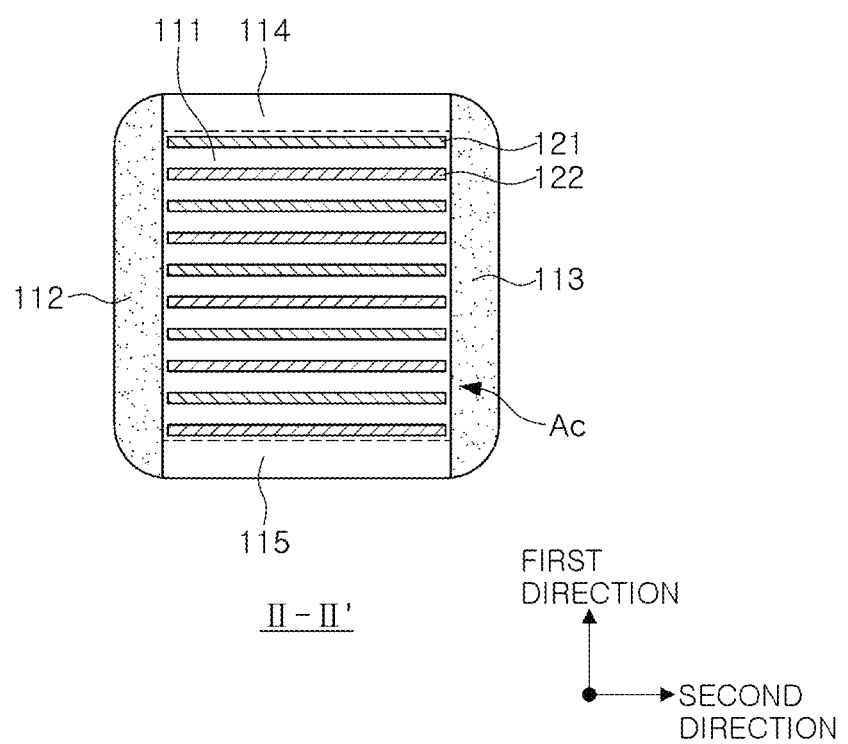
FIG. 4 is a cross-sectional diagram taken along line II-II' in FIG. 1.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another exemplary embodiment without departing from the spirit and scope of the present disclosure. Further, modifications of positions or arrangements of elements in exemplary embodiments may be made without departing from the spirit and scope of the present disclosure. The following detailed description is, accordingly, not to be taken in a limiting sense, and the scope of the present invention are defined only by appended claims, appropriately interpreted, along with the full range of equivalents to which the claims are entitled.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, the first direction may be defined as a lamination direction or a thickness (T) direction, the second direction may be defined as a width (W) direction, and the third direction may be defined as a length (L) direction.

Referring to FIGS. 1 to 4, a multilayer ceramic capacitor 100 may include a ceramic body 110 including a dielectric layer 111 and a plurality of internal electrodes 121 and 122 laminated in a first direction with the dielectric layer 111 interposed therebetween, margin portions 112 and 113 disposed on opposite surfaces of the ceramic body 110 opposing in a second direction perpendicular to the first direction, and external electrodes 131 and 132 disposed on opposite surfaces opposing each other in a third direction perpendicular to the first and second directions and connected to the internal electrodes 121 and 122. Also, the ceramic body 110 may contribute to formation of capacitance of the multilayer ceramic capacitor 100 and may include a capacitance forming portion Ac formed by alternately laminating the plurality of internal electrodes 121 and 122 with the dielectric layer 111 interposed therebetween, and upper and lower cover portions 114 and 115 laminated on the upper and lower surfaces of the capacitance forming portion Ac in the first direction or in the thickness direction, respectively.

Generally, the margin portions 112 and 113 may be formed by physically compressing the ceramic green sheet for forming the margin portions 112 and 113 on the ceramic body 110 and performing a heat treatment. Also, the margin portions 112 and 113 may be formed using a ceramic green sheet having the same dielectric composition as that of the ceramic green sheet forming the dielectric layer 111. Accordingly, physical filling density of the dielectric material in the margin portions 112 and 113 may be low, such that density of the margin portions 112 and 113 may be lowered, and accordingly, moisture resistance reliability of the multilayer ceramic capacitor 100 may degrade.

To address the above issue, in the exemplary embodiment, by preventing a step difference caused by the internal electrodes 121 and 122 and improving density of the margin portions 112 and 113, a method of manufacturing a multilayer ceramic capacitor having improved moisture resistance reliability and a multilayer ceramic capacitor may be provided.

In the description below, a method of manufacturing a multilayer ceramic capacitor according to an exemplary embodiment will be described in greater detail with reference to FIGS. 5A to 5E.

A method of manufacturing a multilayer ceramic capacitor in an exemplary embodiment may include preparing a ceramic green sheet 211 in which a plurality of internal electrode patterns 221 and 222 are formed with a predetermined distance therebetween, forming a ceramic laminate 220 by laminating the ceramic green sheets 211 in a first direction; cutting the ceramic laminate 220 to have a side surface on which an end of each of the internal electrode patterns 221 and 222 is exposed in a second direction perpendicular to the first direction, forming margin portions 212 and 213 on the side surfaces on which the ends of the internal electrode patterns 221 and 222 are exposed, and forming a ceramic body including a dielectric layer and an internal electrode by firing the cut-out ceramic laminate 220, and the forming the margin portions 212 and 213 may include flowing ceramic paste 22 and 23 from an upper portion to a lower portion of the cut-out ceramic laminate 220.

Figure 5A:
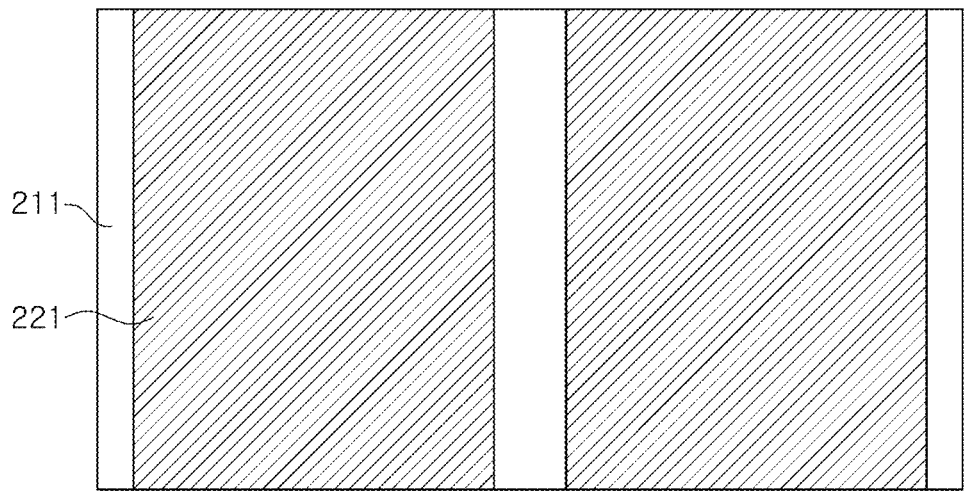
FIGS. 5A to 5E are a cross-sectional diagram and a perspective diagram illustrating a method of manufacturing a multilayer ceramic capacitor according to an exemplary embodiment of the present disclosure.

As illustrated in FIG. 5A, a plurality of first internal electrode patterns 221 may be formed on the ceramic green sheet 211 with a predetermined distance therebetween. In this case, the first internal electrode pattern may have a stripe pattern, and the plurality of first internal electrode patterns 221 may be formed parallel to each other.

The ceramic green sheet 211 may be formed by mixing ceramic powder, a binder, and a solvent and forming a sheet having a thickness of several μm by a doctor blade method.

When the ceramic green sheet 211 is fired, the ceramic green sheet 211 may become the dielectric layer 111 included in the ceramic body 110.

The ceramic powder may not be limited to any particular material as long as sufficient electrostatic capacitance may be obtained. For example, a barium titanate-based powder, a lead composite perovskite-based powder, or a strontium titanate-based powder may be used. The barium titanate-based powder may include $BaTiO_3$ ceramic powder, and an example of the ceramic powder may include $BaTiO_3$, $(Ba_{1-x}Ca_x) TiO_3$, $Ba (Ti_{1-y}Ca_y) O_3$, $(Ba_{1-x}Ca_x) (Ti_{1-y}Zr_y) O_3$ or $Ba (Ti_{1-y}Zr_y) O_3$ in which Ca (calcium) or Zr (zirconium) is partially dissolved in $BaTiO_3$.

In this case, an average thickness td of the ceramic green sheet 211 may be arbitrarily changed in consideration of the size and capacitance of the multilayer ceramic capacitor, and may be 0.6 μm or less for miniaturization and high capacitance of the multilayer ceramic capacitor, but an exemplary embodiment thereof is not limited thereto. The average thickness td of the ceramic green sheet 211 may be measured from an image obtained by scanning the ceramic green sheet 211 using a scanning electron microscope (SEM), and the average value may be measured by measuring the thicknesses in a plurality of points of a single ceramic green sheet 211. Also, a more generalized average value may be measured by extending the measurement of the average value to a plurality of ceramic green sheets 211. Since the thickness td of the ceramic green sheet satisfies 0.6 μm or less, the average thickness of the dielectric layer 111 after firing may be 0.4 μm or less.

The first internal electrode pattern 221 may be formed using a conductive paste for internal electrodes including a conductive metal. A method of forming the first internal electrode pattern 221 on the ceramic green sheet 211 is not limited to any particular example, and may be formed by a screen-printing method or a gravure printing method, for example. Also, the conductive paste for internal electrodes may include a common material powder, a dispersant, and a solvent, but an exemplary embodiment thereof is not limited thereto.

The conductive metal may include one or more of nickel (Ni), copper (Cu), palladium (Pd), silver (Ag), gold (Au), platinum (Pt), tin (Sn), tungsten (W), titanium (Ti) or alloys thereof, but an exemplary embodiment thereof is not limited thereto.

Also, although not illustrated, the second internal electrode pattern 222 may be formed on another ceramic green sheet 211 with a predetermined distance. The ceramic green sheet 211 on which the first internal electrode pattern 221 is formed may be referred to as a first ceramic green sheet, and the ceramic green sheet 211 on which the second internal electrode pattern 222 is formed may be referred to as a second ceramic green sheet.

Figure 5B:
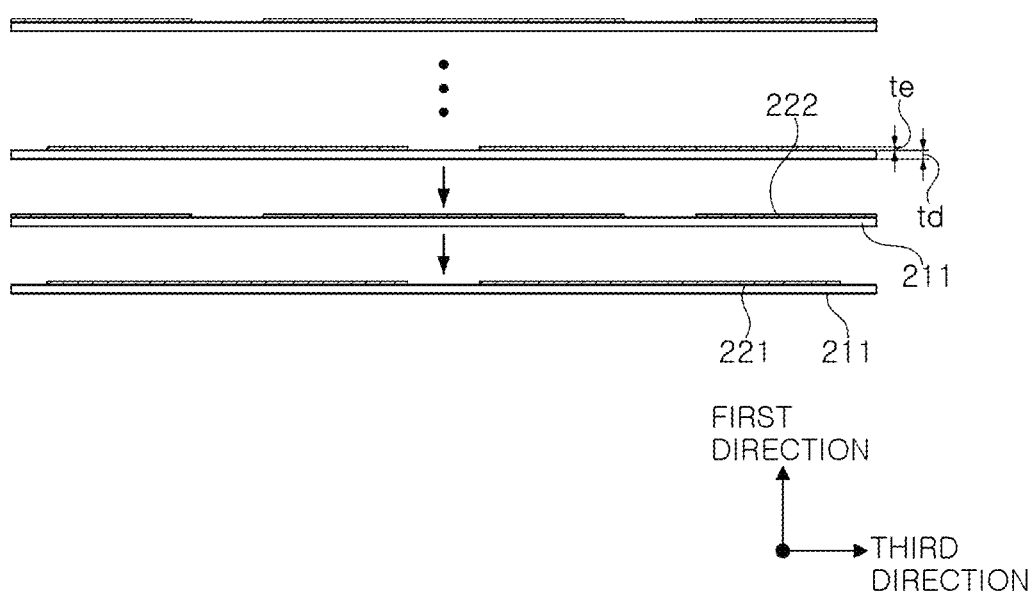

In the description below, as illustrated in FIG. 5B, the first and second ceramic green sheets 211 may be alternately laminated in the first direction such that the first internal electrode pattern 221 and the second internal electrode pattern 222 may be alternately laminated. After firing, the first and second internal electrode patterns 221 and 222 may become the first and second internal electrodes 121 and 122 of the ceramic body 110.

In this case, an average thickness te of the internal electrode patterns 221 and 222 may be arbitrarily changed in consideration of the size and capacitance of the multilayer ceramic capacitor, and may be 0.5 μm or less for miniaturization and high capacitance of the multilayer ceramic capacitor, but an exemplary embodiment thereof is not limited thereto. The average thickness te of the internal electrode patterns 221 and 222 may be measured from an image obtained by scanning the internal electrode patterns 221 and 222 using a scanning electron microscope (SEM), and the average value may be measured by measuring thicknesses at a plurality of points of each of the internal electrode patterns 221 and 222. Also, a more generalized average value may be measured by extending the measurement of the average value to the plurality of internal electrode patterns 221 and 222. Since the thickness te of the internal electrode patterns 221 and 222 satisfies 0.6 μm or less, the average thickness of the internal electrodes 121 and 122 after firing may be 0.4 μm or less.

Figure 5C:
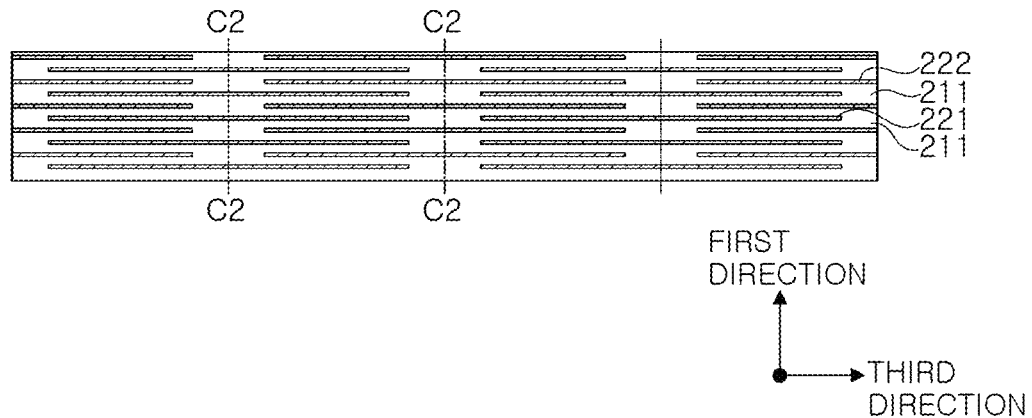
Figure 5D:
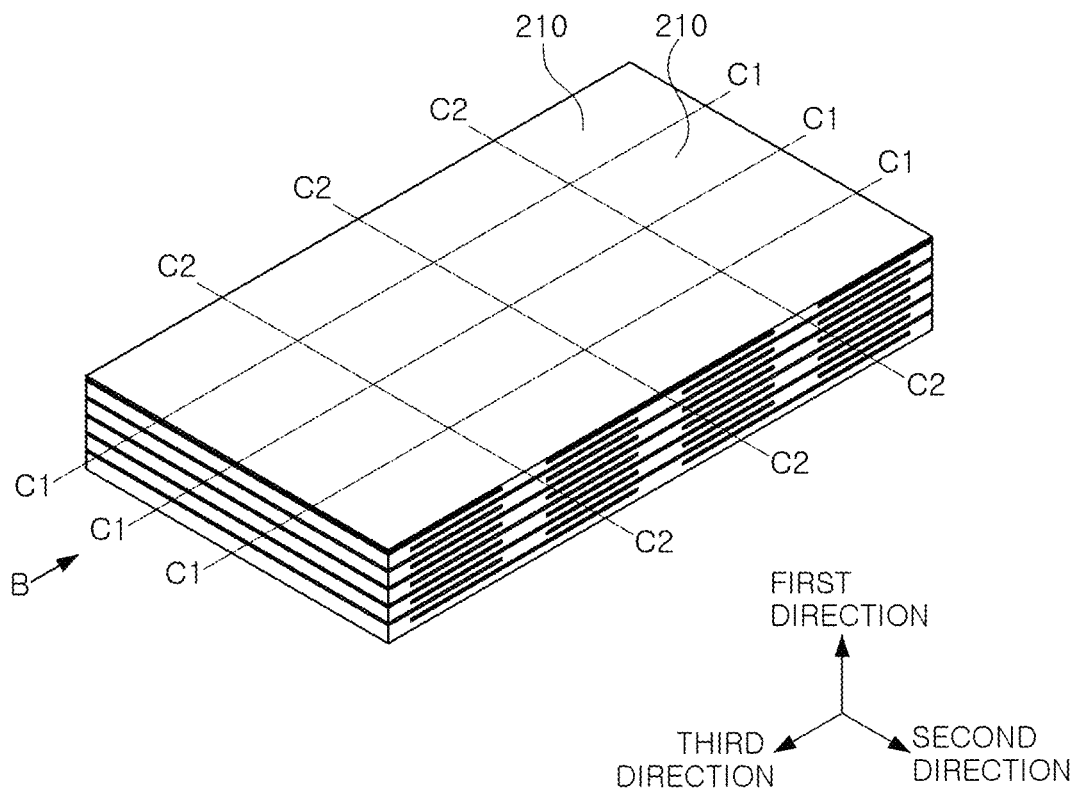

In the description below, referring to FIG. 5C, a plurality of the ceramic green sheets 211 on which the first and second internal electrode patterns 221 and 222 are formed may be laminated in the first direction, thereby forming the ceramic laminate 220. Thereafter, as illustrated in FIG. 5D, the ceramic laminate 220 may be cut along lines C1-C1 and C2-C2 orthogonal to each other such that the ends of the internal electrode patterns 221 and 222 may have side surfaces exposed in the second direction. More specifically, the ceramic laminate 220 may be divided into the laminate bodies 210 having a plurality of laminated bars by cutting along line C1-C1. In this case, ends of the first and second internal electrode patterns 221 and 222 may be exposed to the cut-out surfaces of the laminate body 210. Thereafter, the ceramic laminate 220 may be cut along line C2-C2, thereby dividing into the laminate bodies 210 having a form of a plurality of laminate chips.

Figure 5E:
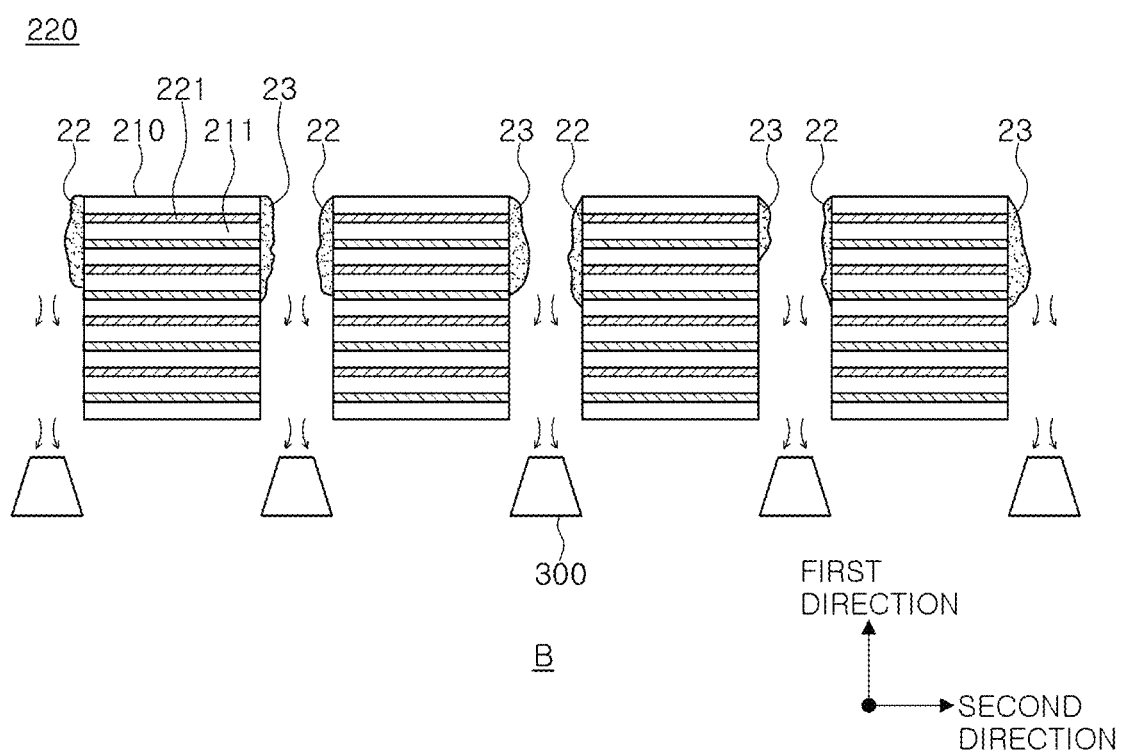

In the description below, as illustrated in FIG. 5E, first and second margin portions 212 and 213 may be formed on the side surfaces of the plurality of laminated bodies 210 from which the ends of the internal electrode patterns 221 and 222 are exposed, respectively. In this case, the forming the first and second margin portions 212 and 213 may include flowing ceramic paste 22 and 23 from an upper portion to a lower portion of the cut-out ceramic laminate 220.

Generally, the margin portions 212 and 213 may be formed by firing a region other than the regions of the ceramic green sheet 211 in which the internal electrode patterns 221 and 222 are formed. However, in the process of laminating, compressing, and cutting the ceramic green sheets 211 formed in several tens to several hundreds of layers, a step difference may be formed such that the internal electrode patterns 221 and 222 may be bent.

Also, generally, to address the issue of the step difference, the margin portions 212 and 213 may be formed by attaching the ceramic green sheet for forming the margin portion by physical compression and performing a high temperature heat treatment. Accordingly, when adhesive force between the ceramic green sheet for forming the margin portion and the laminate body 210 is insufficient, exterior defects and cracks may occur and moisture resistance reliability may degrade.

In an exemplary embodiment, after cutting the ceramic laminate 220 to have side surfaces from which the ends of the internal electrode patterns 221 and 222 are exposed, ceramic pastes 22 and 23 may be allow to flow from an upper portion to a lower portion of the cut-out ceramic laminate 220, thereby forming the first and second margin portions 212 and 213. Accordingly, a step difference caused by the internal electrode patterns 221 and 222 may be prevented such that a ceramic capacitor having improved reliability may be provided.

Also, since the first and second margin portions 212 and 213 are formed by flowing the ceramic paste 22 and 23 from an upper portion to a lower portion of the cut-out ceramic laminate 220, exterior defects and cracks caused by separation of the margin portions 212 and 213 may be prevented, and moisture resistance reliability of the multilayer ceramic capacitor may improve.

Also, in an exemplary embodiment, the margin portions 212 and 213 may be formed using the ceramic pastes 22 and 23 having a high filling rate of the ceramic powder. Since the ceramic pastes 22 and 23 in a liquid state may have a filling rate and dispersibility of ceramic powder higher than those of the ceramic slurry for forming the ceramic green sheet 211, the margin portions 212 and 213 including less pores and having high sintering density may be implemented when the margin portions 212 and 213 are formed. Accordingly, after firing, the margin portions 112 and 113 of the multilayer ceramic capacitor 100 may have density higher than that of the dielectric layer 111.

After firing, the average thickness of the margin portions 112 and 113 may be arbitrarily changed in consideration of the size and capacitance of the multilayer ceramic capacitor 100, and may be 2 μm to 15 μm. The average thickness of the margin portions 112 and 113 may be measured from images obtained by scanning cross-sectional surface of the multilayer ceramic capacitor 100 taken in the first and second directions using a scanning electron microscope (SEM), and the thicknesses of the margin portions 112 and 113 may be measured and an average value thereof may be measured.

In an exemplary embodiment, the ceramic pastes 22 and 23 may have viscosity higher than that of the ceramic slurry forming the ceramic green sheet 211. The high viscosity of the ceramic pastes 22 and 23 may indicate that the ceramic pastes 22 and 23 may have a filling rate of ceramic powder higher than that of the ceramic slurry. Since the ceramic pastes 22 and 23 may have viscosity higher than that of the ceramic slurry forming the ceramic green sheet 211, the ceramic pastes 22 and 23 may be prevented from being drawn to the lower region of the side surface of the laminate body 210 due to gravity. Accordingly, the ceramic pastes 22 and 23 may be uniformly applied to the upper and lower regions of the side surface of the laminate body 210, and the margin portions 212 and 213 having sintering density may be formed through the ceramic pastes 22 and 23 having an excellent filling rate and excellent dispersibility of the ceramic powder.

Generally, viscosity of ceramic slurry may be in the range of 1,000 to 3,000 CPS (10 rpm), but viscosity of the ceramic pastes 22 and 23 in an exemplary embodiment may be 20,000 to 40,000 CPS (10 rpm). When viscosity of the ceramic pastes 22 and 23 is within the above range, it may be difficult to apply the ceramic pastes 22 and 23 to the side surface of the laminate body 210 by a general manufacturing method due to high viscosity. Accordingly, the ceramic pastes 22 and 23 may be applied to the side surface of the laminate body 210 by including the process of flowing from an upper portion to a lower portion of the ceramic laminate body 220. Accordingly, the multilayer ceramic capacitor 100 having high density of the margin portions 112 and 113 after firing may be implemented.

In an exemplary embodiment, the forming the margin portions 212 and 213 may further include suctioning the ceramic paste 22 and 23 from the lower portion of the cut-out ceramic laminate 220. More specifically, a suction device 300 may be disposed between the plurality of laminate bodies 210 formed by cutting the ceramic laminate body 220 and may suction the ceramic pastes 22 and 23. When the ceramic pastes 22 and 23 have high viscosity due to a high filling rate of the ceramic powder, the ceramic pastes may not flow from the upper portion to the lower portion of the side surface of the laminate body 210 simply by gravity. In this case, the method may further include suctioning the ceramic pastes 22 and 23 with the suction device 300 to apply the ceramic pastes 22 and 23 to the side surfaces of the laminate body 210 in a uniform thickness.

Figure 6A:
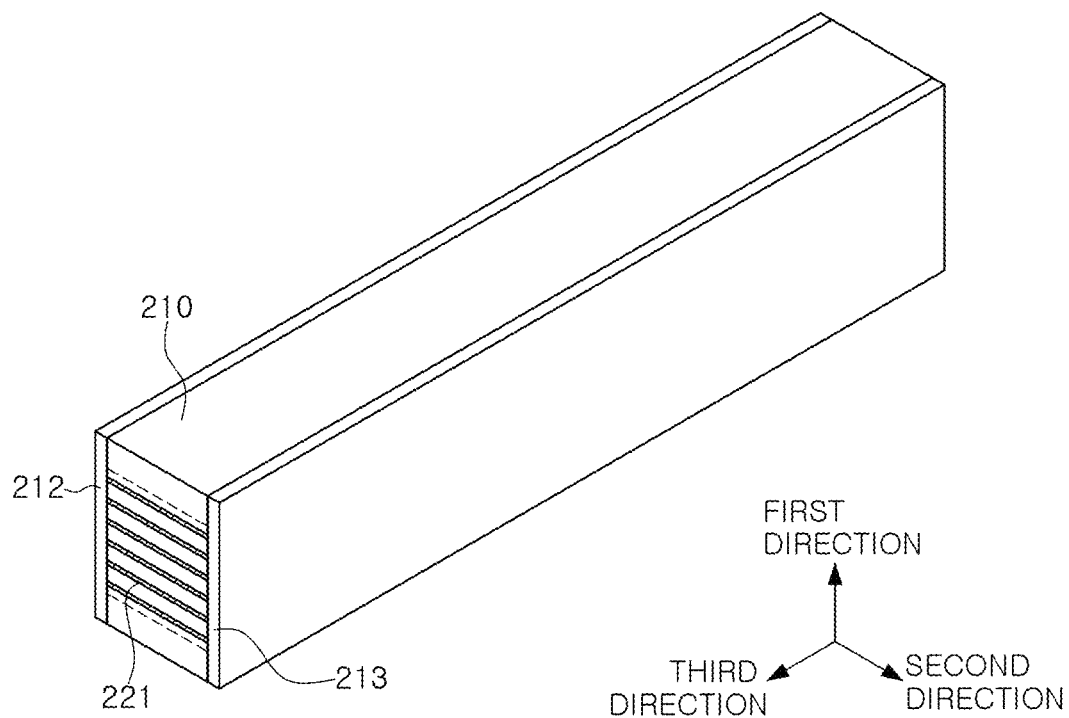
FIG. 6A is a perspective diagram illustrating a laminate body according to an exemplary embodiment of the present disclosure.

In this case, referring to FIG. 6A, the forming the margin portions 212 and 213 may include preparing the laminate body 210 in the state of a plurality of laminated bars formed by cutting the ceramic laminate body 220, and applying the ceramic pastes 22 and 23 to the laminate body 210 in the state of a plurality of laminated bars by flowing the ceramic pastes 22 and 23 from the upper portion to the lower portion of the side surface of the laminate body 210. The laminate body 210 in the state of a plurality of laminated bars may be formed by cutting the ceramic laminate body 220 along line C1-C1.

Figure 6B:
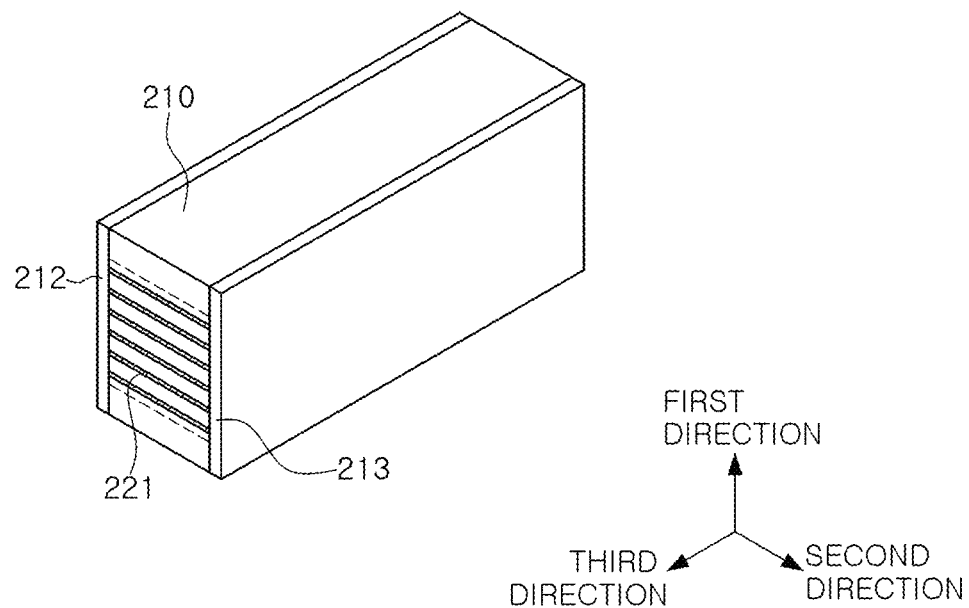
FIG. 6B is a perspective diagram illustrating a laminate body according to an exemplary embodiment of the present disclosure.

Also, referring to FIG. 6B, the forming the margin portions 212 and 213 may include preparing the laminate body 210 in the state of a plurality of laminated chips formed by cutting the ceramic laminate body 220, and applying the ceramic pastes 22 and 23 to the laminate body 210 in the state of a plurality of laminated chips by flowing the ceramic pastes 22 and 23 from the upper portion to the lower portion of the side surface of the laminate body 210. The laminate body 210 in the state of a plurality of laminated chips may be formed by cutting the ceramic laminate body 220 along lines C1-C1 and C2-C2.

Thereafter, by sintering the plurality of cut-out laminate bodies 210, the ceramic body 110 including the dielectric layer 111 and the internal electrodes 121 and 122 may be formed. Also, in the ceramic body 110, the first and second external electrodes 131 and 132 may be formed on the fifth and sixth surfaces 5 and 6 of the ceramic body 110 to which the first and second internal electrodes 121 and 122 are alternately exposed. The first and second external electrodes 131 and 132 may be formed by dipping the ceramic body 110 in a conductive paste for external electrodes and firing the ceramic body 110, but an exemplary embodiment thereof is not limited thereto. The external electrodes 131 and 132 may be formed by a method of attaching or transferring a sheet or an electroless plating method or a sputtering method.

Hereinafter, a multilayer ceramic capacitor according to another exemplary embodiment will be described in greater detail.

According to another exemplary embodiment, the multilayer ceramic capacitor including a ceramic body 110 including a dielectric layer 111 and a plurality of internal electrodes 121 and 122 laminated in the first direction with the dielectric layer interposed therebetween, and margin portions 112 and 113 disposed on opposite surfaces of the ceramic body 110 opposing in the second direction perpendicular to the first direction, and external electrodes 131 and 132 disposed on opposite surfaces opposing in the third direction perpendicular to the first and second directions and connected to the internal electrodes 121 and 122 may be provided, where the margin portions 112 and 113 may have density higher than that of the dielectric layer 111.

The shape of the ceramic body 110 may not be limited to any particular shape, but as illustrated, the ceramic body 110 may have a hexahedral shape or a shape similar to a hexahedral shape. Due to reduction of ceramic powder included in the ceramic body 110 or grinding of corners thereof during a firing process, the ceramic body 110 may not have an exact hexahedral shape formed by linear lines but may have a substantially hexahedral shape.

The ceramic body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the ceramic body 110 may be in a fired state, and a boundary between the adjacent dielectric layers 111 may be integrated with each other such that the boundary may not be distinct without using a scanning electron microscope (SEM).

The internal electrodes 121 and 122 may be alternately disposed with the dielectric layer 111, and the first internal electrode 121 and the second internal electrode 122 may oppose face each other with the dielectric layer 111 interposed therebetween.

That is, the first and second internal electrodes 121 and 122 may be configured as a pair of electrodes having different polarities, and may be formed to be alternately exposed through the fifth and sixth surfaces 5 and 6 of the ceramic body 110 along the lamination direction of the dielectric layer 111 with the dielectric layer 111 interposed therebetween by printing a conductive paste for internal electrodes including a conductive metal in a predetermined thickness.

The external electrodes 131 and 132 may be formed externally of the ceramic body 110 and may be connected to the internal electrodes 121 and 122, and specifically, may include the first and second external electrodes 131 and 132 disposed on the fifth and sixth surface 5 and 6 of the ceramic body 110 opposing each other in the third direction, respectively. Accordingly, the first external electrode 131 may be connected to the plurality of first internal electrodes 121 exposed through the fifth surface 5 of the ceramic body 110, and the second external electrode 132 may be connected to the plurality of second internal electrodes 122 exposed through the sixth surface 6 of the ceramic body 110.

In this case, the external electrodes 131 and 132 may be configured as fired electrodes including a conductive metal and glass, and as the conductive metal, one of silver (Ag), lead (Pb), platinum (Pt), nickel (Ni) and copper (Cu) or an alloy thereof may be used, but an exemplary embodiment thereof is not limited thereto.

The external electrodes 131 and 132 may include a plurality of layers, and a plating layer may be disposed on the external electrodes 131 and 132. The plating layer may improve mounting properties of the multilayer ceramic capacitor 100.

The plating layer may include at least one of Ni, Sn, Cu, Pd, and alloys thereof, and may include a plurality of layers. In particular, the plating layer may include a nickel (Ni) plating layer and a tin (Sn) plating layer laminated in order on the external electrodes 131 and 132.

The margin portions 112 and 113 may include the first margin portion 112 and the second margin portion 113 disposed on the third and fourth surfaces 3 and 4 of ceramic body 110 opposing each other in the second direction, respectively, and may prevent damages to the internal electrodes 121 and 122 due to physical or chemical stress together with the upper and lower cover portions 114 and 115.

In this case, the margin portions 112 and 113 may have density higher than that of the dielectric layer 111. Also, the margin portions 112 and 113 may have density higher than that of the upper and lower cover portions 114 and 115. As an example of a method of measuring a density of a target area, a cross-sectional surface of the ceramic body 110 taken in the first direction and the second direction may be imaged using a scanning electron microscope (SEM), and from the SEM images, the density may be be measured by measuring a ratio of a dielectric area excluding a pore area to a total area of the target area in the margin portions 112 and 113 or in the dielectric layer 111 or the upper and lower cover portions 114 and 115, using a computer program such as SigmaScan Pro, but an exemplary embodiment thereof is not limited thereto.

The margin portions 112 and 113 may be formed by firing a ceramic paste having a high filling rate of ceramic powder, and the dielectric layer 111 may be formed by firing a ceramic green sheet having a lower filling ratio of ceramic powder than that of the ceramic paste. Accordingly, the portions 112 and 113 may have sintered density higher than that of the dielectric layer 111.

In this case, a density at the interfacial surface between the margin portions 112 and 113 and the ceramic body 110 may be 98% or more. Accordingly, permeation of external moisture from a boundary between the margin portions 112 and 113 and the ceramic body 110 may be prevented such that the multilayer ceramic capacitor 100 having improved moisture resistance reliability may be provided. As an example of a method of measuring a density at the interfacial surface, density may be measured from the area obtained by multiplying a length in the first direction by a length in the second direction (e.g., 10 μm×10 μm) with reference to the interfacial surface on the cross-sectional surface of the ceramic body 110 in the first direction and the second direction, where the interfacial surface is a surface at which the margin portions 112 and 113 are in contact with the ceramic body 110, but an exemplary embodiment thereof is not limited thereto. Also, as described above, density at the interfacial surface between the margin portions 112 and 113 and the ceramic body 110 may obtained by imaging the cross-sectional surface of the ceramic body 110 taken in the first direction and the second direction using a scanning electron microscope (SEM), and measuring the SEM image using a computer program such as SigmaScan Pro. In this case, when the average value is obtained by measuring density in the plurality of cross-sectional surface taken in the first direction and the second direction, density at the interfacial surface between the margin portions 112 and 113 and the ceramic body 110 may be further generalized.

The multilayer ceramic capacitor 100 in another exemplary embodiment may have the same configuration as that of the above-described multilayer ceramic capacitor 100 according to the exemplary embodiment. Therefore, overlapping descriptions will not be provided.

Embodiment

The ceramic laminate 220 was formed by laminating the ceramic green sheets 211 on which the internal electrode patterns 221 and 222 were formed, the ceramic laminate was cut to form a plurality of laminated bodies 210, and margin portions 212 and 213 were formed on the side surfaces of the laminate body 210. Thereafter, the laminate body 210 was calcined at 400° C. or less in a nitrogen atmosphere, was fired under conditions of temperature of 1250° C. or less, and a hydrogen concentration of 1% $H_2$, thereby preparing a ceramic body 110 including the dielectric layer 111 and the internal electrodes 121 and 122.

In this case, moisture resistance reliability and density of the exemplary embodiment manufactured according to exemplary embodiments of the present disclosure, in which the ceramic pastes 22 and 23 were allowed to flow from the upper portion to the lower portion of the cut-out ceramic laminate 220, were compared with moisture resistance reliability and density of the comparative example, in which the margin portion was formed by attaching the ceramic green sheet as in the general method. In this case, moisture resistance reliability was tested in 1 to 2Vr, 8585 conditions (85° C. and relative humidity 85%).

Figure 7A:
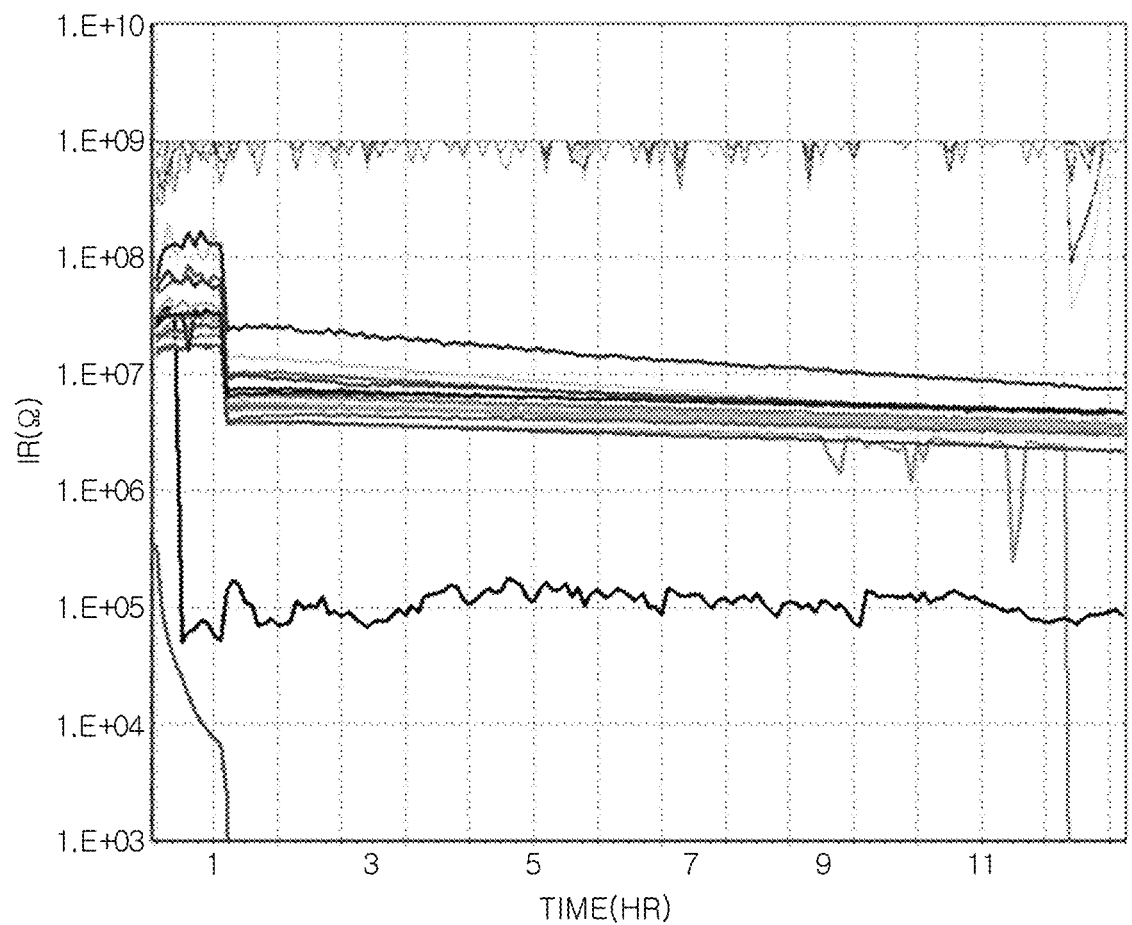
FIG. 7A is graphs illustrating results of moisture resistance reliability test according to a comparative example.
Figure 7B:
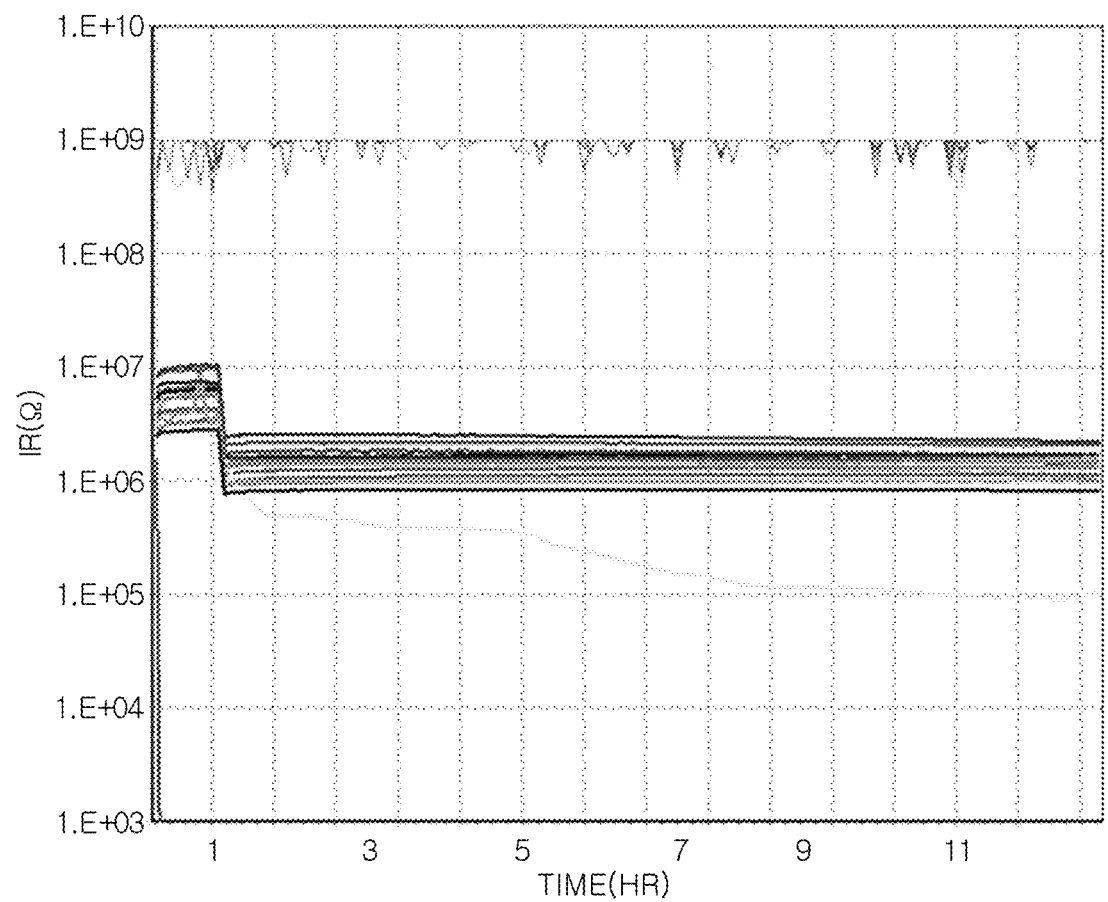
FIG. 7B is graphs illustrating results of moisture resistance reliability test according to an exemplary embodiment of the present disclosure.

7A is a graph of testing moisture resistance reliability of the comparative example, and FIG. 7B is a graph testing moisture resistance reliability of the exemplary embodiment. According to FIGS. 7A and 7B, it is indicated that, in the comparative example, there was a problem in moisture resistance reliability, and in the exemplary embodiment, moisture resistance reliability was excellent.

Figure 8A:
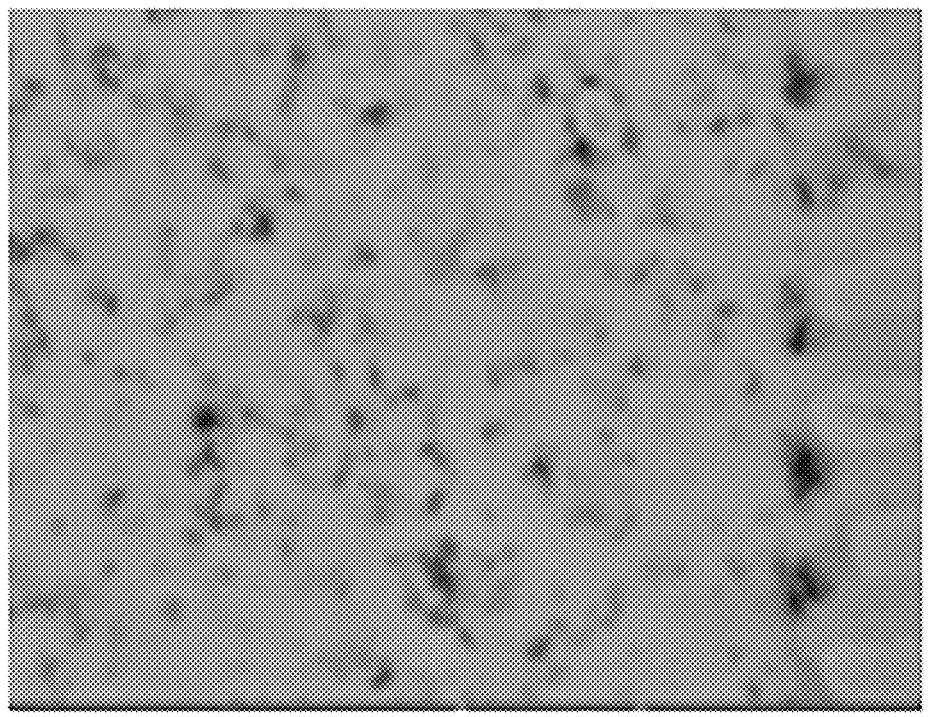
FIG. 8A is an image of an interfacial surface between a margin portion and a ceramic body of a comparative example, obtained using a scanning electron microscope (SEM)
Figure 8B:
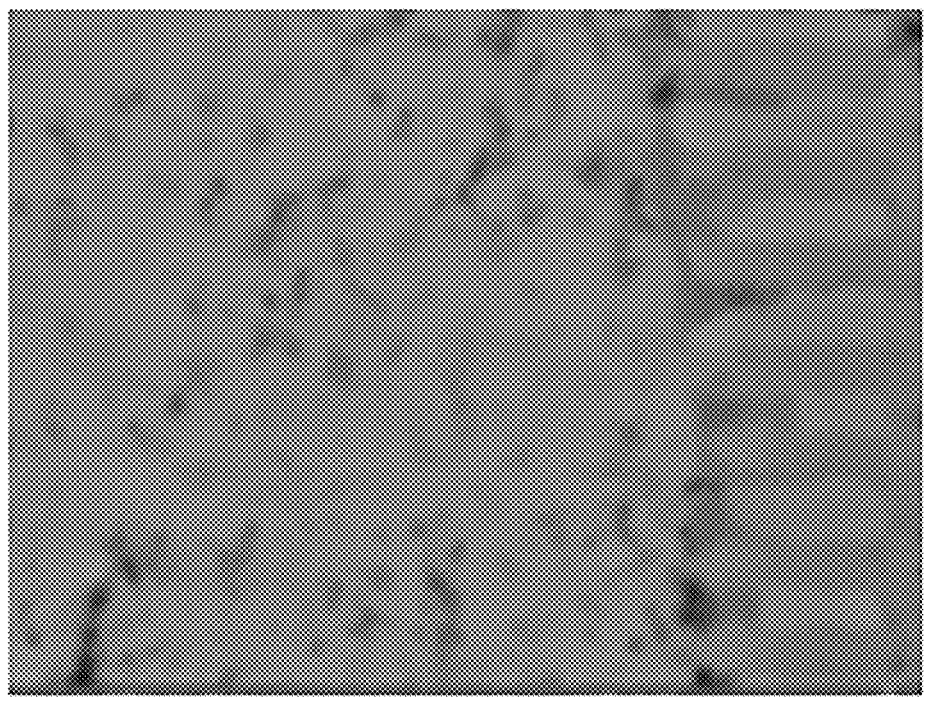
FIG. 8B is an image of an interfacial surface between a margin portion and a ceramic body of an exemplary embodiment of the present disclosure, obtained using an SEM.

FIG. 8A is an image of a portion of the interfacial surface between the margin portions 112 and 113 and the ceramic body 110 on the cross-sectional surface of the ceramic body 110 of the comparative example in the first and second directions, obtained using a scanning electron microscope (SEM). FIG. 8B is an image of a portion of the interfacial surface between the margin portions 112 and 113 and the ceramic body 110 on the cross-sectional surface of the ceramic body 110 of the exemplary embodiment in the first and second directions, obtained using an SEM.

Thereafter, from the SEM image, by measuring the ratio of the dielectric area in an area of a predetermined size excluding pores on the interfacial surface between the margins 112 and 113 and the ceramic body 110 to the total measured area using the SigmaScan Pro program, the density at the interfacial surface between the margin portions 112 and 113 and the ceramic body 110 was measured. For example, the density may be measured in three samples (the number of sample is not limited thereto) in the exemplary embodiment and the comparative example, and was measured in the area having a length in the first direction and a length in the second direction (e.g., 10 µm×10 µm) with reference to the interfacial surface on which the margin portions 112 and 113 are in contact with the ceramic body 110.

In the comparative example, the average value of density at the interfacial surface between the margin portions 112 and 113 and the ceramic body 110 was 97.4%, and in the exemplary embodiment, the average value of density at the interfacial surface between the margin portions 112 and 113 and the ceramic body 110 was 98.92%. Accordingly, in the exemplary embodiment, it is confirmed that density at the interfacial surface between the margin portions 112 and 113 and the ceramic body 110 was improved.

According to the aforementioned exemplary embodiments, moisture resistance reliability may be secured by improving sintering density of the margin portion of the multilayer ceramic capacitor.

Also, high reliability of the multilayer ceramic capacitor may be secured by preventing cracks caused by a step difference and pores.

While the exemplary embodiments have been illustrated and described above, it will be apparent to those skilled in the art that modifications and variations could be made without departing from the scope of the present invention as defined by the appended claims.

What is claimed is:

1. A method of manufacturing a multilayer ceramic capacitor, the method comprising:
   preparing a plurality of ceramic green sheets in which a plurality of internal electrode patterns are respectively formed with a predetermined distance therebetween;
   forming a ceramic laminate by laminating the plurality of ceramic green sheets in a first direction;
   cutting the ceramic laminate to have a side surface to which an end of an internal electrode pattern among the plurality of internal electrode patterns is exposed in a second direction perpendicular to the first direction;
   forming a margin portion on the side surface of the ceramic laminate; and
   forming a ceramic body including a dielectric layer and an internal electrode by firing the cut-out ceramic laminate,
   wherein the forming a margin portion includes flowing a ceramic paste from an upper portion to a lower portion of the cut-out ceramic laminate.

2. The method of claim 1, wherein the ceramic paste has viscosity higher than viscosity of a ceramic slurry forming the ceramic green sheet.

3. The method of claim 1, wherein the forming a margin portion further includes suctioning the ceramic paste in the lower portion of the cut-out ceramic laminate.

4. The method of claim 1, wherein the margin portion has a density higher than a density of the dielectric layer.

5. The method of claim 1, wherein the forming a margin portion is performed in a state of a plurality of laminated bars formed by cutting the ceramic laminate.

6. The method of claim 1, wherein the forming a margin portion is performed in a state of a plurality of laminated chips formed by cutting the ceramic laminate.

7. The method of claim 1, wherein an average thickness of the margin portion in the second direction is 2 µm to 15 µm.

8. The method of claim 1, wherein an average thickness of the dielectric layer in the first direction is 0.4 µm or less.

9. A multilayer ceramic capacitor manufactured using the method of claim 1, wherein the multilayer ceramic capacitor comprises:
   a ceramic body including a dielectric layer and a plurality of internal electrodes laminated in a first direction with the dielectric layer interposed therebetween;
   margin portions disposed on opposite surfaces of the ceramic body opposing in a second direction perpendicular to the first direction; and
   external electrodes disposed on opposite surfaces opposing in a third direction perpendicular to the first and second directions and connected to the internal electrodes,
   wherein the margin portion has a density higher than a density of the dielectric layer.

10. The multilayer ceramic capacitor of claim 9, wherein a density on an interfacial surface between the margin portion and the ceramic body is 98% or more.

11. The multilayer ceramic capacitor of claim 9, wherein an average thickness of the margin portion in the second direction is 2 µm to 15 µm.

12. The multilayer ceramic capacitor of claim 9, wherein an average thickness of the dielectric layer in the first direction is 0.4 µm or less.

13. The multilayer ceramic capacitor of claim 9, wherein the ceramic body further includes:
   a capacitance forming portion defined by the plurality of internal electrodes alternately laminated with the dielectric layer interposed therebetween; and upper and lower cover portions, which are dielectric portions, disposed on upper and lower surfaces, respectively, of the capacitance forming portion in the first direction.

14. The multilayer ceramic capacitor of claim 13, wherein the density of the margin portion is higher than densities of the upper and lower cover portions.

15. The multilayer ceramic capacitor of claim 9, wherein at least one plating layer is disposed on each of the external electrodes.

16. The multilayer ceramic capacitor of claim 15, wherein the at least one plating layer includes a nickel (Ni) plating layer and a tin (Sn) plating layer laminated in order on each of the external electrodes.

* * * * *